United States Patent [19]

Shouse

[11] Patent Number: 5,868,530
[45] Date of Patent: Feb. 9, 1999

[54] CUTTING TOOL

[76] Inventor: Virgil Shouse, 7044 Denton Hill Rd., Fenton, Mich. 48430

[21] Appl. No.: 729,114

[22] Filed: Oct. 11, 1996

Related U.S. Application Data

[60] Provisional application No. 60/005,390 Oct. 12, 1995.
[51] Int. Cl.$^6$ ..................................................... B23B 27/16
[52] U.S. Cl. .......................... 407/101; 407/107; 407/112
[58] Field of Search ................................. 407/66, 77, 87, 407/91, 97, 101, 107, 109, 112

[56] References Cited

U.S. PATENT DOCUMENTS

| | | |
|---|---|---|
| 280,148 | 6/1883 | Douglas . |
| 3,500,523 | 3/1970 | Cashman et al. .................... 407/101 X |
| 3,808,655 | 5/1974 | Foster ................................... 407/109 X |
| 4,057,884 | 11/1977 | Suzuki ........................................ 407/89 |
| 4,077,735 | 3/1978 | Dick et al. ........................... 407/112 X |
| 4,118,138 | 10/1978 | Takacs et al. ........................ 407/101 X |
| 4,189,264 | 2/1980 | Kraemer .............................. 407/101 X |
| 4,812,087 | 3/1989 | Stashko . |
| 4,876,932 | 10/1989 | Nessel ........................................ 82/158 |
| 4,966,500 | 10/1990 | Tsujimura et al. ......................... 407/34 |
| 5,076,334 | 12/1991 | Landtwing ............................. 407/91 X |
| 5,139,371 | 8/1992 | Kraft et al. ............................... 407/101 |
| 5,207,724 | 5/1993 | Shouse .................................... 407/108 |
| 5,688,080 | 11/1997 | Hedlund .................................. 407/101 |

FOREIGN PATENT DOCUMENTS

| | | |
|---|---|---|
| 320809 | 10/1929 | United Kingdom . |
| 569862 | 6/1945 | United Kingdom . |

*Primary Examiner*—Andrea L. Pitts
*Assistant Examiner*—Henry W.H. Tsai
*Attorney, Agent, or Firm*—Young & Basile, P.C.

[57] ABSTRACT

A cutting tool and shank is disclosed, the shank including a seat for receiving therein the cutting tool, the seat having at least two non co-planar surfaces. The cutting tool and shank further include a spring-biased ball projecting from either the shank or the cutting tool and engageable with a cavity provided within the other of the shank or cutting tool so as to urge the cutting tool into the seat of the shank. A detent element may also be provided which, according to one embodiment of the present invention, comprise a groove formed in one of the cutting tool or the shank, and a flange formed in the other of the cutting tool or the shank, the flange being receivable within the groove to restrain the cutting tool on the shank. The cutting tool may comprise a cartridge including at least first and second mateable halves. According to this embodiment, a bolt releasably engageable with the shank may be provided for removably capturing the first and second halves of the cartridge in a mated condition. An annular groove is provided on the bolt shaft. At least one setting screw rotatably disposed within at least one of the first or second halves of the cutting tool is selectively engageable within the annular groove to removably retain the cutting tool on the bolt shaft. The first and second halves of the cutting tool may further include engageable aligning elements for precise mating of the first and second halves.

22 Claims, 3 Drawing Sheets

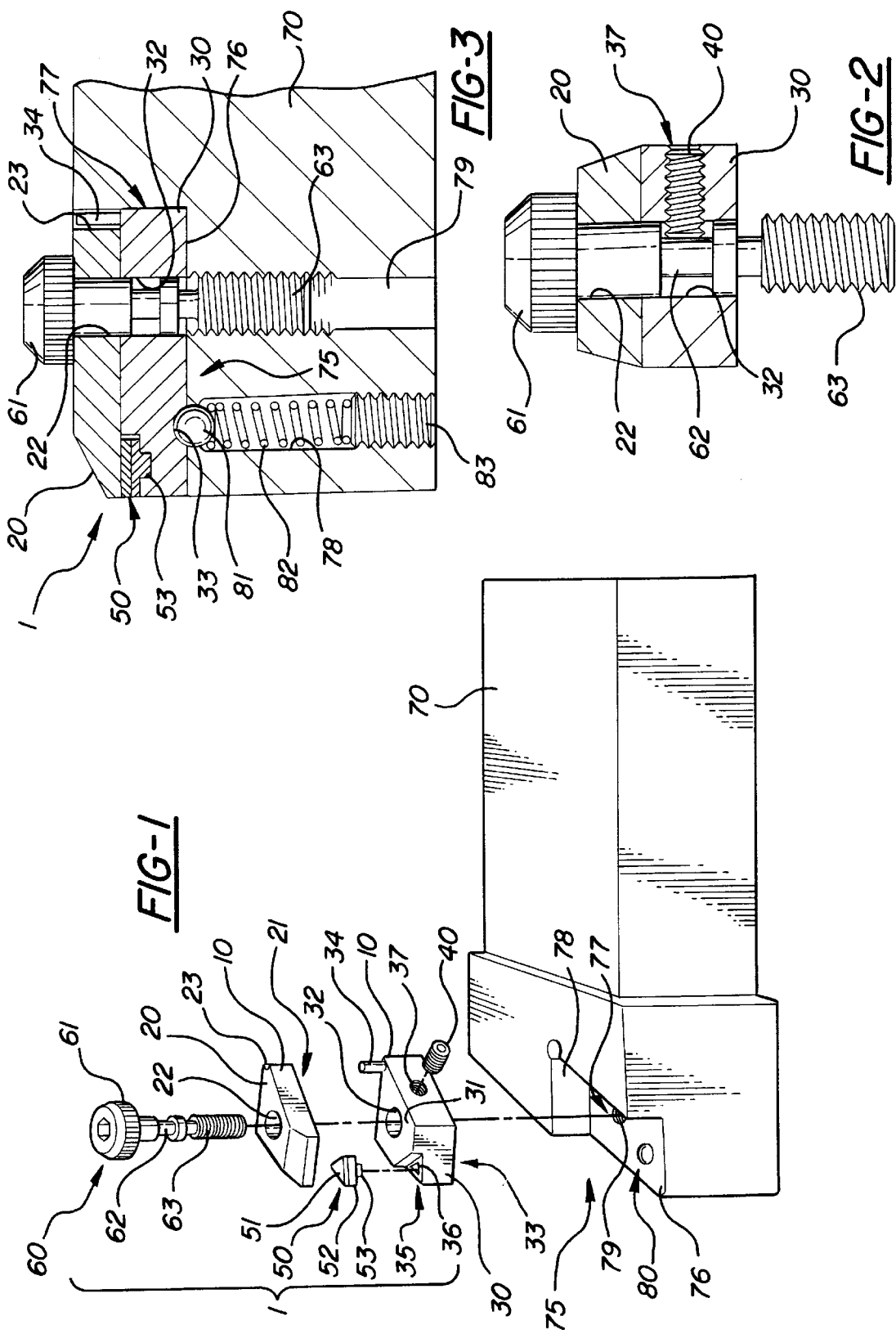

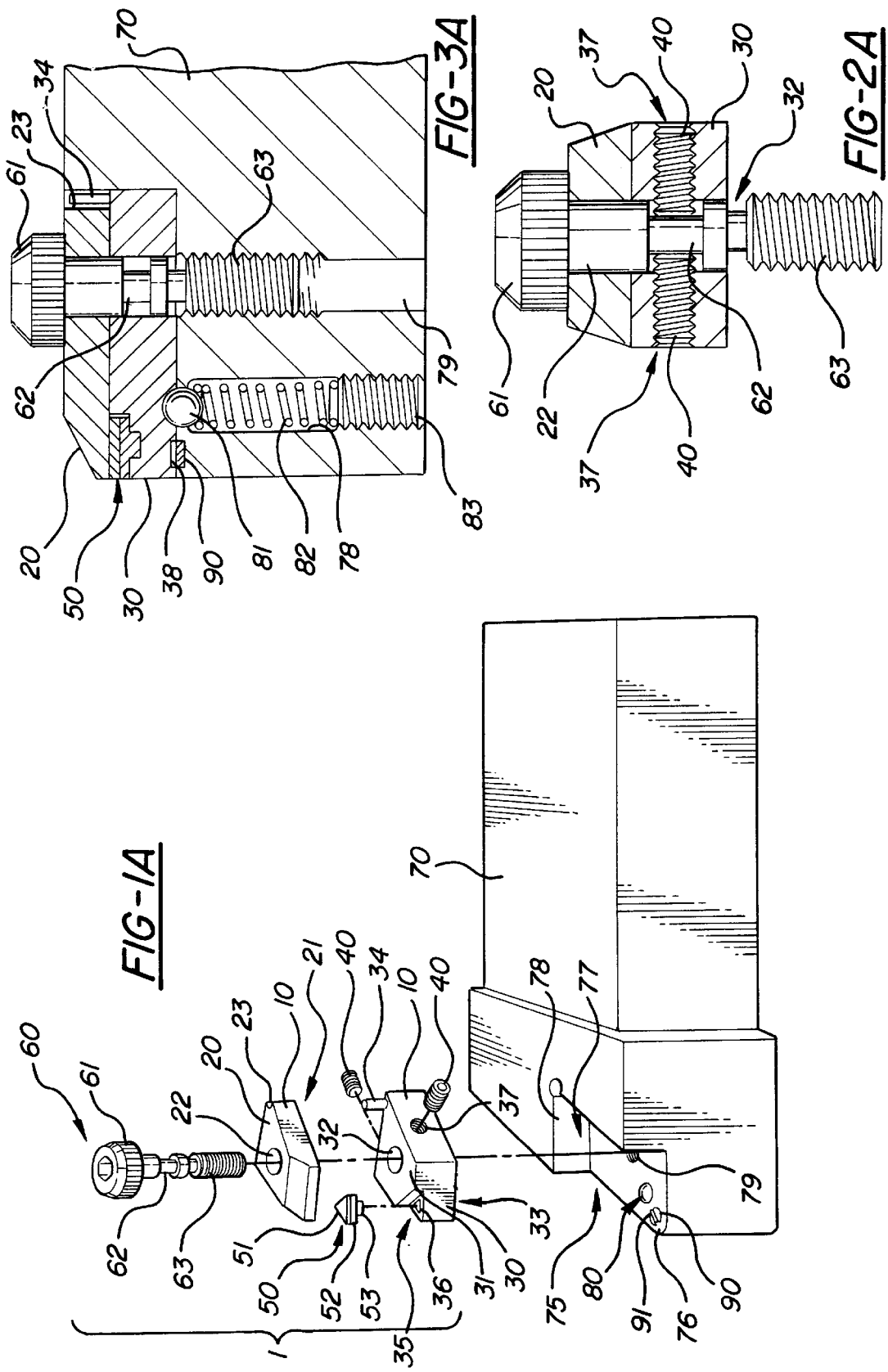

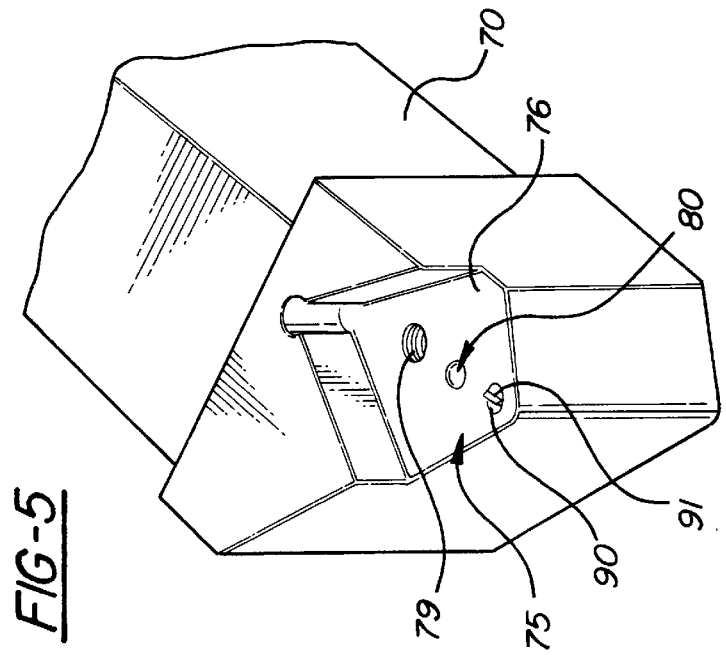
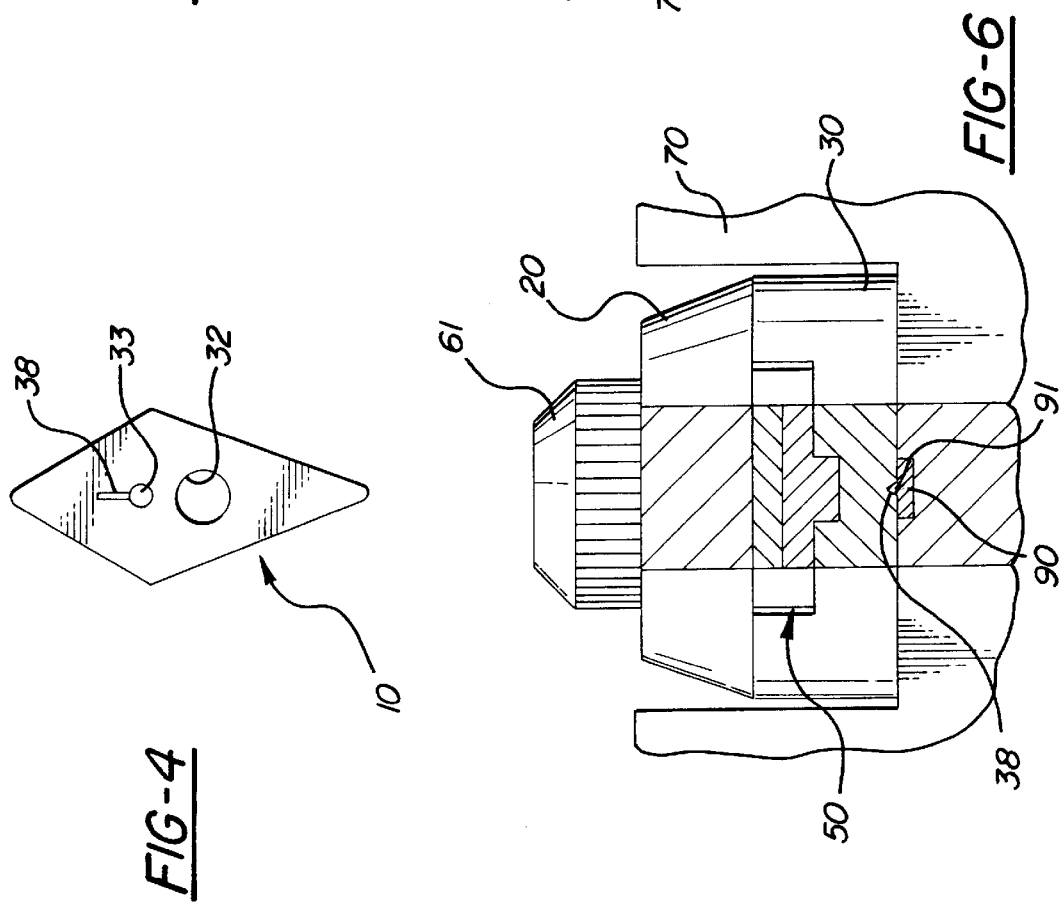

CUTTING TOOL

This application and claims the benefit of priority from Provisional Application Ser. No. 60/005,390, filed Oct. 12, 1995.

FIELD OF THE INVENTION

The present invention relates to cutting tools and more particularly to an improved cutting tool including positioning means permitting repeatably precise alignment both of the cutting tip within the cutting tool cartridge and the cutting tool on the shank.

BACKGROUND

Cutting tools are well known and have a variety of applications in the manufacturing industry, including the turning of the interior or exterior of metal components such as break drums or pistons.

The typical cutting tool comprises a cutting tip of hard material such as diamond or carborundum detachably secured to a cutting tip support, which in turn is releasably held in position by a shank. Commonly, the cutting tip is secured directly to the support by adhesive or a bolt.

The extremely tight tolerances required in cutting tool applications necessitates both that the cutting tip be precisely secured to the cutting tip support, and that the support be precisely positioned on the shank. However, cutting tips are subject to wear and must frequently be replaced; a process which typically requires that the cutting tip support be removed from the shank. Unfortunately, replacement of the cutting tip, as well as repositioning of the support on the shank, are manual operations. As a result, it is not uncommon for the functional performance of the cutting tool to be degraded.

SUMMARY OF THE DISCLOSURE

Accordingly, it is an object of the present invention to provide a cutting tool including a cutting tip which may be repeatably secured to the cutting tip support with precision.

A further object of the present invention is to provide for means whereby the cutting tool may be repeatably securely positioned on the shank with precision.

These and other objects and advantages of the present invention are accomplished through an improved cutting tool of the type removably secured to the seat of a shank, the cutting tool comprising a cutting tip including a cutting portion defining a first geometric shape and a seating portion defining a second geometric shape. The cutting tip is sandwiched between a cartridge comprising first and second axially mating halves. Fixing means are provided for capturing the first and second halves of the cartridge in a mated condition, the fixing means further releasably engageable with the seat of the shank. The fixing means comprise a threaded bolt including a shaft, and each of the first and second halves further includes a coaxial bore therethrough for receiving the bolt shaft.

According to yet another feature of this invention, the bolt and the cartridge include means by which the cartridge is removably retained on the bolt shaft. These means comprise an annular groove on the shaft and a setting screw rotatably disposed within one of either of the first or second mateable halves. The setting screw is selectively positionable within the annular groove so as to prevent the cutting tip support from being withdrawn from the bolt shaft.

According to a further feature the present invention includes positioning means provided on both the seat of the shank and the second mateable half so as to urge the cartridge into the cavity, ensuring repeatable precision when securing the cartridge to the shank. The positioning means comprise spring-biased means projecting from the seat of the shank and a cavity within one of the first or second mateable halves adjacent to and engageable with the spring-biased means. In the illustrated form, the spring-biased means comprise a ball and spring positioner, the cavity receiving the ball element of the ball and spring positioner.

According to yet another feature of the present invention, the positioning means further comprise detent means comprising a groove formed in either the cutting tool or shank, and a flange formed in the other of the cutting tool or shank. The flange is engageable with the groove to restrain the cutting tool on the shank. According to one feature of this invention, the groove is formed on one of the first or second halves of the cutting tool cartridge, the flange being formed on the seat of the shank.

According to a further feature of the present invention, the first and second halves of the cartridge further include complimentary aligning elements. These complimentary aligning elements comprise a pin projecting vertically from the second element, and a channel provided on the first element. The pin is slidingly receivable within the channel.

BRIEF DESCRIPTION OF THE DRAWINGS

FIG. 1 depicts an exploded perspective view of the present invention;

FIG. 1A depicts an exploded perspective view of an alternate embodiment of the present invention;

FIG. 2 depicts the cutting tool portion and fixing means of the present invention in cross-section;

FIG. 2A depicts an alternate embodiment of the fixing means shown in FIG. 2;

FIG. 3 is a lateral cross-section of the present invention, depicting both the fixing means and positioning means thereof;

FIG. 3A is a lateral cross-section of an alternate embodiment of the present invention as depicted in FIG. 3;

FIG. 4 is an elevational view of the underside of the cartridge according to one embodiment of the present inventive cutting tool, depicting a portion of the positioning means of the present invention;

FIG. 5 is a perspective view of the shank according to one embodiment of the present invention, depicting the spring-biased means and detent means thereof; and FIG. 6 is a partial frontal cross-section according to one embodiment of the present invention, depicting the detent means thereof.

DESCRIPTION OF THE ILLUSTRATED EMBODIMENT

Referring now to the figures, an improved cutting tool is provided wherein the cutting tip is securely removably sandwiched between axially mateable halves of a cartridge. The cutting tip includes a seating portion corresponding in dimensions to a seat provided in one half of the cartridge such that the cutting tip may be replaced with precision. Positioning means are provided in both the shank and the cutting tool whereby the cartridge may be repeatably securely disposed on the shank with precision.

Turning now to FIGS. 1 and 1A, the present invention generally comprises a cutting tip 50 removably sandwiched between first 20 and second 30 halves of cartridge 10; first 20 and second 30 halves being removably captured in an assembled, axially mated condition by fixing means 60. Fixing means 60 further detachably secure cartridge 10 to seat 75 of shank 70, which seat 75 is characterized by dimensions similar to cartridge 10 and is at least partially defined by a cavity 77 between opposed walls 78. Positioning means comprising spring-biased means 80 protruding from seating surface 76 of seat 75 are engageable with a corresponding cavity 33 provided on the lower surface of second half 30 of cartridge 10. In the most preferred form of the present invention, further positioning means are provided which comprise detent means. As shown, detent means include a flange 91 protruding from a circular disc 90 recessed in seating surface 76 of seat 75, flange 91 being receivable within a correspondingly-shaped groove (not shown) provided on the underside of second half 30. Of course, it will be appreciated that such further positioning means may take any of a variety of forms, including ball and socket and the like.

Both first 20 and second 30 halves of cartridge 10 are preferably manufactured according to known techniques from a billet of suitably strong raw material such as steel or the like. Both first 20 and second 30 halves of cartridge 10 define similar geometric shapes complimentary to each other and seat 75 in shank 70. While any geometric shapes are adaptable for use in the present invention, the illustrated diamond shape of cartridge 10 is preferred as it precludes unwanted lateral movement of cutting tool 1 during operation thereof. Vertically oriented, coaxially aligned bores 22 and 32 are provided in each half 20 and 30, respectively, and receive fixing means 60 of the illustrated embodiment therethrough. First 20 and second 30 halves further include opposed surfaces 21 and 31, respectively, which provide for continuous abutting contact between first 20 and second 30 halves in the axially mated cartridge 10.

A pin 34 projecting vertically upwards from surface 31 of second half 30 is slidingly received in a channel 23 provided in first half 20, thereby ensuring precise lateral alignment of both halves 20 and 30 in the assembled cartridge 10. A recessed platform 35 opens onto the forward end of second half 30, the platform removably receiving cutting tip 50 thereon. Platform 35 defines a geometric shape having dimensions similar to those of cutting tip 50, and further includes therein a seat 36 corresponding in dimensions to and engageable with seating portion 53 of cutting tip 50. Second half 30 further includes a threaded, transverse bore 37 communicating with bore 32 and receiving therein setting screw 40. (FIG. 2.) In the preferred embodiment, fixing means 60 comprise a bolt 61 the shaft of which includes a threaded portion 63 and a medially disposed annular groove 62. In the assembled cartridge 10, bolt 61 is received through bores 22, 32; first 20 and second 30 halves being coaxially mated thereon such that annular groove 62 is disposed in lateral alignment with threaded bore 37. Setting screw 40 is selectively positionable within bore 37 and may be positioned so as to extend within bore 32 and groove 62, thereby preventing the removal of first 20 and second 30 halves from bolt 61. As depicted in FIG. 2A, the most preferred form of the present invention contemplates two such setting screws 40 disposed in threaded bores 37 provided on opposite lateral sides of second half 30 of cartridge 10. Such a configuration has been found to augment retention of bolt 61 within bores 22 and 32, thereby preventing unwanted separation of the assembled cartridge 10.

Referring again to FIG. 1, cutting tip 50 preferably comprises a cutting portion including a cutting layer 51 of suitably hard material, such as diamond, carborundum, or the like supported on a substrate layer 52 of steel or other metal. Extending from the lower surface of cutting tip 50 coaxial with both substrate layer 52 and cutting layer 51 is seating portion 53. As with substrate layer 52, seating portion 53 is preferably manufactured from metal such as steel or the like, and for that reason seating portion 53 is formed integrally with substrate layer 52 in the preferred form of this invention. The cutting portion of cutting tip 50 defines a first geometric shape, while seating portion 53 defines a second geometric shape. In the illustrated embodiment, both the cutting portion and the seating portion 53 define triangular shapes. Of course, it will be appreciated that both the cutting portion and seating portion 53 may each define any geometric shape, whether similar or dissimilar, according to user preference.

Turning now to FIG. 3, the positioning means of the present invention preferably comprises spring-biased means engageable with a corresponding hemispherical cavity 33 disposed on the under surface of second half 30. In the illustrated form, the spring-biased means comprise a ball bearing 81 captured within a threaded bore 78 in shank 70 and urged upwards by a coil spring 82 so as to partially protrude through an opening in seating surface 76 of seat 75. A threaded screw 83 is selectively positionable within bore 78 to maintain spring 82 and ball bearing 81 therein, as well as to selectively adjust the relative tension imposed on ball bearing 81. Preferably, the location of the positioning means in relation to cavity 33 is such that as ball bearing 81 is brought into engagement with cavity 33 during engagement of cartridge 10 to seat 75, the entire cartridge 10 is urged gently towards shank 70 and into secure engagement with cavity 77 of seat 75. As will be appreciated, these positioning means ensure that cutting tool 1 may be repeatedly removed and installed within seat 75 with great precision, thereby providing for consistent alignment of the cutting tool with respect to shank 70.

As indicated, the positioning means of the most preferred form of the present invention also include detent means. With reference being had to FIGS. 3A, 4, 5, and 6, these detent means are shown as comprising a flange 91 of triangular cross-section protruding upwardly from a circular disc 90 recessed in seating surface 76 of seat 75. Flange 90 is provided in axial alignment with and engages a correspondingly-shaped groove 38 provided on the underside of second half 30 immediately forward of cavity 33. As depicted, both groove 38 and flange 91 are oriented coaxial with the longitudinal axis of cartridge 10. Accordingly, engagement of flange 91 and groove 38 in the assembled cutting tool and shank of the present invention securely retains cartridge 10 in place on seat 75, preventing unwanted lateral movement of cartridge 10. As with the remainder of cutting tool 1 or shank 70, the detent means are preferably manufactured from metal or other suitably hard material. But while detent means are shown as being formed separately from and subsequently mounted on shank 70, it is also contemplated that flange 91 be formed integrally with shank 70.

It is of course understood that the foregoing is merely illustrative of the present invention and that many additions and modifications thereto, apparent to those of ordinary skill in the art, will be possible without departing from the spirit and broader aspects of this invention as set forth in the appended The invention in which an exclusive property or privilege is claimed is defined as follows:

1. A cutting tool and shank, said shank including a seat for receiving therein said cutting tool, said seat having at least two non co-planar surfaces, wherein said cutting tool and said shank are provided with spring-biased means for urging said cutting tool into said seat, said means projecting from either said shank or said cutting tool and engageable with a cavity provided within the other of said shank or said cutting tool.

2. The cutting tool and shank of claim 1, wherein said means for urging said cutting tool into said seat comprise an upwardly biased ball at least partially protruding from said shank.

3. The cutting tool and shank of claim 1, further comprising detent means.

4. The cutting tool and shank of claim 3, wherein said detent means comprise a groove formed in one of said cutting tool or said shank, and a flange formed in the other of said cutting tool or said shank, said flange being receivable within said groove to restrain said cutting tool on said shank.

5. The cutting tool and shank of claim 4, wherein said cutting tool comprises a cartridge including at least first and second mateable halves, wherein said groove is provided on one of said at least first or second halves, and said flange is provided on said seat of said shank.

6. The cutting tool and shank of claim 1, wherein said cutting tool comprises a cartridge including at least first and second mateable halves, and further including fixing means for removably capturing said first and second halves in a mated condition, said fixing means being releasably engageable with said shank.

7. The cutting tool and shank of claim 6, said fixing means comprising a bolt including a shaft, and said first and second halves of said cutting tool including bores for receiving therethrough said bolt shaft.

8. The cutting tool and shank of claim 7, wherein said bolt and said cutting tool further include means by which said cutting tool is removably retained on said bolt shaft.

9. The cutting tool and shank of claim 8, wherein said means by which said cutting tool is removably retained on said bolt shaft comprise an annular groove provided on said bolt shaft, and at least one setting screw rotatably disposed within at least one of said first or second halves of said cutting tool, said at least one setting screw selectively engageable within said groove.

10. The cutting tool and shank of claim 1, wherein said cutting tool comprises a cartridge including at least first and second mateable halves, and wherein said first and second halves further include engageable aligning elements for precise mating of said first and second halves.

11. The cutting tool of claim 10, wherein said aligning elements comprise a pin projecting from one of said first or second halves of said cartridge, and a channel provided on the other of said first or second halves of said cartridge, said pin being slidingly receivable within said channel.

12. A cutting tool and shank, said shank including a seat for receiving therein said cutting tool, said cutting tool being fixable to said seat, and said seat having at least two non co-planar surfaces and defining a cavity, wherein said cutting tool and said shank are provided with spring-biased means for urging said fixed cutting tool rearwardly into secure engagement with said cavity of said seat, said means projecting from said shank and engageable with a cavity provided on said cutting tool.

13. The cutting tool and shank of claim 12, wherein said means for urging said cutting tool into said seat comprise an upwardly biased ball at least partially protruding from said shank.

14. The cutting tool and shank of claim 13, further comprising detent means comprising a groove provided in one of said cutting tool or said shank, and a flange provided in the other of said cutting tool or said shank, said flange being receivable within said groove to restrain said cutting tool on said shank.

15. The cutting tool and shank of claim 14, wherein said cutting tool comprises a cartridge including at least first and second halves, and further including fixing means for removably capturing said first and second halves in a mated condition, said fixing means comprising a bolt releasably engageable with said shank, said bolt including a shaft, and said first and second halves of said cutting tool including bores for receiving therethrough said bolt shaft.

16. The cutting tool and shank of claim 15, wherein said bolt and said cutting tool further include means by which said cutting tool is removably retained on said bolt shaft, said means comprising an annular groove provided on said bolt shaft, and at least one setting screw rotatably disposed within at least one of said first or second halves of said cutting tool, said at least one setting screw selectively engageable within said groove.

17. The cutting tool and shank of claim 16, wherein said first and second halves of said cartridge further include engageable aligning elements for precise mating of said first and second halves, said aligning elements comprising a pin projecting from one of said first or second halves of said cartridge, and a channel provided on the other of said first or second halves of said cartridge, said pin being slidingly receivable within said channel.

18. A cutting tool and shank, said cutting tool comprising a cartridge including at least first and second halves, and said shank including a seat for receiving therein said cutting tool, said seat having at least two non co-planar surfaces, wherein said cutting tool and said shank include spring-biased means projecting from said shank for urging said cutting tool into said seat, and a cavity provided within one of said halves of said cartridge, said means engageable with said cavity to urge said cutting tool into said seat, and further comprising detent means comprising a groove provided in one of said cutting tool or said shank, and a flange provided in the other of said cutting tool or said shank, said flange being receivable within said groove.

19. The cutting tool and shank of claim 18, wherein said means for urging said cutting tool into said seat comprise an upwardly biased ball at least partially protruding from said shank.

20. The cutting tool and shank of claim 19, further including fixing means for removably capturing said first and second halves in an axially mated condition, said fixing means comprising a bolt releasably engageable with said shank, said bolt including a shaft, and said first and second halves of said cutting tool including bores for receiving therethrough said bolt shaft.

21. The cutting tool and shank of claim 20, wherein said bolt and said cutting tool further include means by which said cutting tool is removably retained on said bolt shaft, said means comprising an annular groove provided on said bolt shaft, and at least one setting screw rotatably disposed within at least one of said first or second halves of said cutting tool, said at least one setting screw selectively engageable within said groove.

22. The cutting tool and shank of claim 21, wherein said first and second halves of said cartridge further include engageable aligning elements for precise mating of said first and second halves, said aligning elements comprising a pin projecting from one of said first or second halves of said cartridge, and a channel provided on the other of said first or second halves of said cartridge, said pin being slidingly receivable within said channel.

* * * * *

UNITED STATES PATENT AND TRADEMARK OFFICE
CERTIFICATE OF CORRECTION

PATENT NO. : 5,868,530
DATED : February 9, 1999
INVENTOR(S) : Shouse

It is certified that error appears in the above-indentified patent and that said Letters Patent is hereby corrected as shown below:

Column 1, line 1, delete "and";

Column 4, line 63, after "appended", insert --claims.--

Signed and Sealed this

Twenty-seventh Day of July, 1999

Attest:

Attesting Officer

Q. TODD DICKINSON

Acting Commissioner of Patents and Trademarks